United States Patent
Kulzer et al.

(10) Patent No.: US 7,406,937 B2
(45) Date of Patent: Aug. 5, 2008

(54) METHOD FOR OPERATING AN INTERNAL COMBUSTION ENGINE

(75) Inventors: André-Francisco Casal Kulzer, Boeblingen (DE); Jochen Laubender, Stuttgart (DE); Udo Sieber, Bietigheim (DE)

(73) Assignee: Robert Bosch GmbH, Stuttgart (DE)

( * ) Notice: Subject to any disclaimer, the term of this patent is extended or adjusted under 35 U.S.C. 154(b) by 246 days.

(21) Appl. No.: 10/540,657

(22) PCT Filed: Jun. 24, 2003

(86) PCT No.: PCT/DE03/02090

§ 371 (c)(1),
(2), (4) Date: Dec. 30, 2005

(87) PCT Pub. No.: WO2004/061274

PCT Pub. Date: Jul. 22, 2004

(65) Prior Publication Data

US 2006/0201469 A1    Sep. 14, 2006

(30) Foreign Application Priority Data

Dec. 23, 2002   (DE) ................. 102 60 748

(51) Int. Cl.
*F01L 1/34*     (2006.01)
*F02D 13/02*    (2006.01)
*F02D 41/06*    (2006.01)
*F02N 17/00*    (2006.01)

(52) U.S. Cl. .......... 123/179.3; 123/179.4; 123/179.18

(58) Field of Classification Search ........... 123/179.4, 123/179.5, 179.18, 179.16, 179.17, 179.3, 123/178.5
See application file for complete search history.

(56) References Cited

U.S. PATENT DOCUMENTS

| 4,009,695 | A | * | 3/1977 | Ule ......................... 123/179.5 |
| 4,635,595 | A | * | 1/1987 | Grabbe ................. 123/179.31 |
| 6,334,417 | B1 | * | 1/2002 | Salber et al. ............. 123/179.1 |
| 6,397,803 | B1 | | 6/2002 | Takahashi et al. |
| 6,588,397 | B1 | * | 7/2003 | Sieber ........................ 123/295 |
| 6,647,955 | B1 | * | 11/2003 | Sieber ..................... 123/179.3 |
| 6,718,928 | B2 | * | 4/2004 | Brueggen et al. ........ 123/179.5 |
| 6,772,723 | B2 | * | 8/2004 | Aoki et al. ............... 123/179.4 |

(Continued)

FOREIGN PATENT DOCUMENTS

DE    199 03 594    8/1999

(Continued)

*Primary Examiner*—Stephen K. Cronin
*Assistant Examiner*—Arnold Castro
(74) *Attorney, Agent, or Firm*—Kenyon & Kenyon LLP

(57) ABSTRACT

A method for operating an internal combustion engine having at least one triggerable intake valve and at least one triggerable discharge valve, in which the internal combustion engine is directly started in a start-up operating mode and, following the start, is operated in at least one other operating mode. A starting discharge instant of a discharge valve of the internal combustion engine that is used during the start-up operating mode is retarded in time with respect to a standard discharge instant so as to improve the direct start-up characteristics of the internal combustion engine. In addition, to further improve the direct start-up characteristics, it is possible to retard a closing instant of an intake valve that is used during the start-up operating mode with respect to a standard closing instant.

15 Claims, 4 Drawing Sheets

U.S. PATENT DOCUMENTS

| | | | |
|---|---|---|---|
| 6,799,547 B2 * | 10/2004 | Sieber | 123/179.5 |
| 2002/0157630 A1 * | 10/2002 | Gerhard et al. | 123/179.5 |
| 2002/0166531 A1 * | 11/2002 | Ackermann et al. | 123/179.16 |
| 2003/0101956 A1 * | 6/2003 | Sieber | 123/179.5 |
| 2003/0106515 A1 * | 6/2003 | Kondo | 123/179.4 |

FOREIGN PATENT DOCUMENTS

| | | |
|---|---|---|
| DE | 199 55 857 | 6/2001 |
| DE | 1996098 A1 * | 6/2001 |
| DE | 100 20 104 | 10/2001 |
| DE | 100 20 325 | 11/2001 |
| DE | 101 11 928 | 10/2002 |
| EP | 1 217 176 | 6/2002 |
| GB | 2 367 859 | 4/2002 |
| JP | 11062640 | 3/1999 |
| JP | 2002227668 | 8/2002 |

* cited by examiner

METHOD FOR OPERATING AN INTERNAL COMBUSTION ENGINE

FIELD OF THE INVENTION

The present invention relates to a method for operating an internal combustion engine having at least one triggerable intake valve and at least one triggerable discharge valve, in which the internal combustion engine is directly started in a start-up operating mode and, after the start, is operated in at least one other operating mode. Furthermore, the present invention relates to an internal combustion engine having at least one triggerable intake valve and at least one triggerable discharge valve, which is started directly in a start-up operating mode and is operated in at least one other operating mode after the start.

Furthermore, the present invention relates to a control device for a generic internal combustion engine as well as a computer program for the control device.

BACKGROUND INFORMATION

The principle of a direct start of internal combustion engines, i.e., the starting of the internal combustion engine without electrical starter or similar device, is known.

To allow a reliable direct start-up of an internal combustion engine from standstill, fuel must be injected into the particular combustion chamber of a cylinder of the internal combustion engine that happens to be in a power stroke at that time. In the subsequent ignition of the injected fuel, the pressure in the cylinder rises and drives a piston of the cylinder, which outputs action via a crankshaft.

SUMMARY OF THE INVENTION

It is an objective of the present invention to further develop a generic operating method as well as an internal combustion engine and a control device for it, in such a way that a simple and reliable direct start-up of the internal combustion engine is ensured.

According to the present invention, this objective is achieved in an operating method of the type mentioned at the outset in that a starting discharge instant of the discharge valve, which is used during the start-up operating mode for the discharge of waste gases of the internal combustion engine, is time-retarded relative to a standard discharge instant used during the additional operating mode(s), and/or in that a closing instant of the intake valve for the aspiration of fresh gas used during the start-up-operating mode is time-retarded with respect to a standard closing instant used during the additional operating mode(s).

Retarding the starting discharge instant according to the present invention relative to the standard discharge instant has the result that the combustion energy released during the first combustion in the direct start-up of the internal combustion engine is able to be converted into mechanical action in a more optimal manner, the mechanical action being able to be utilized to start the internal combustion engine. This will ensure that the largest possible portion of the combustion energy is used to start the internal combustion engine.

Another positive effect resulting in the operating method according to the present invention is the lowering of a compression pressure in a combustion chamber of the individual cylinder of the internal combustion engine. This lowering results from the reduced air requirement caused by the retarding of the closing instant of the intake valve in the start-up operating mode.

The retardation of the starting discharge instant according to the present invention, together with the retardation of the closing instant, is able to be utilized in the start-up operating mode. It is also possible to utilize either only the retardation of the starting discharge instant or the retardation of the closing instant in the start-up operating mode.

In the case of valve-gear systems having camshaft(s), the present invention proposes that the retardation be implemented by adjusting a discharge-camshaft that triggers the discharge valve and/or an intake-camshaft that triggers the intake valve. According to an additional specific embodiment of the operating method of the present invention, phase actuators, in particular, are used to adjust the camshaft(s). In this context, it is also conceivable to simultaneously trigger an intake camshaft and a discharge camshaft using one phase actuator.

Another specific embodiment of the present invention provides that, as an alternative to the phase actuator or in parallel thereto, a valve-gear system that influences the opening time of the intake valve/discharge valve be used to adjust the intake camshaft and/or the discharge camshaft.

Another, very advantageous specific embodiment of the present invention provides that the intake camshaft and/or the discharge camshaft be already adjusted for a subsequent start in the start-up operating mode upon deactivation of the internal combustion engine. This dispenses with the requirement of adjusting the camshaft(s) immediately prior to the next start.

According to another specific embodiment of the method according to the present invention, the intake valve and/or the discharge valve are/is triggered by a camshaft-free valve-gear system, i.e., in an electromagnetic or hydraulic manner, for example. The retardation of the starting discharge instant and the closing instant according to the present invention is also possible thereby and may generally even be realized at a lower mechanical effort.

Another, very advantageous specific embodiment of the method according to the present invention provides for a valve lift of the intake valve or the discharge valve to be varied, which makes it possible to further improve the direct-start characteristics of the internal combustion engine.

Another specific embodiment of the present invention in which the retardation is reduced in a stepwise manner with increasing rotational speed of the internal combustion engine, is very advantageous as well. It is also possible to deactivate the retardation once a predefinable minimum speed of the internal combustion engine has been exceeded, that is to say, without a stepwise reduction.

As a further achievement of the objective of the present invention, it is proposed for a generic internal combustion engine and for a generic control device that a starting discharge instant of the discharge valve, which is used during the start-up operating mode for the discharge of waste gases of the internal combustion engine, be time-retarded relative to a standard discharge instant that is used during the additional operating mode(s), and/or that a closing instant of the intake valve, which is used during the start-up operating mode for the aspiration of fresh gas, be time-retarded relative to a standard closing instant that is used during the additional operating mode(s).

As an additional further achievement of the object of the present invention, a computer program for a generic control device is provided as well.

DETAILED DESCRIPTION

Figure 10:
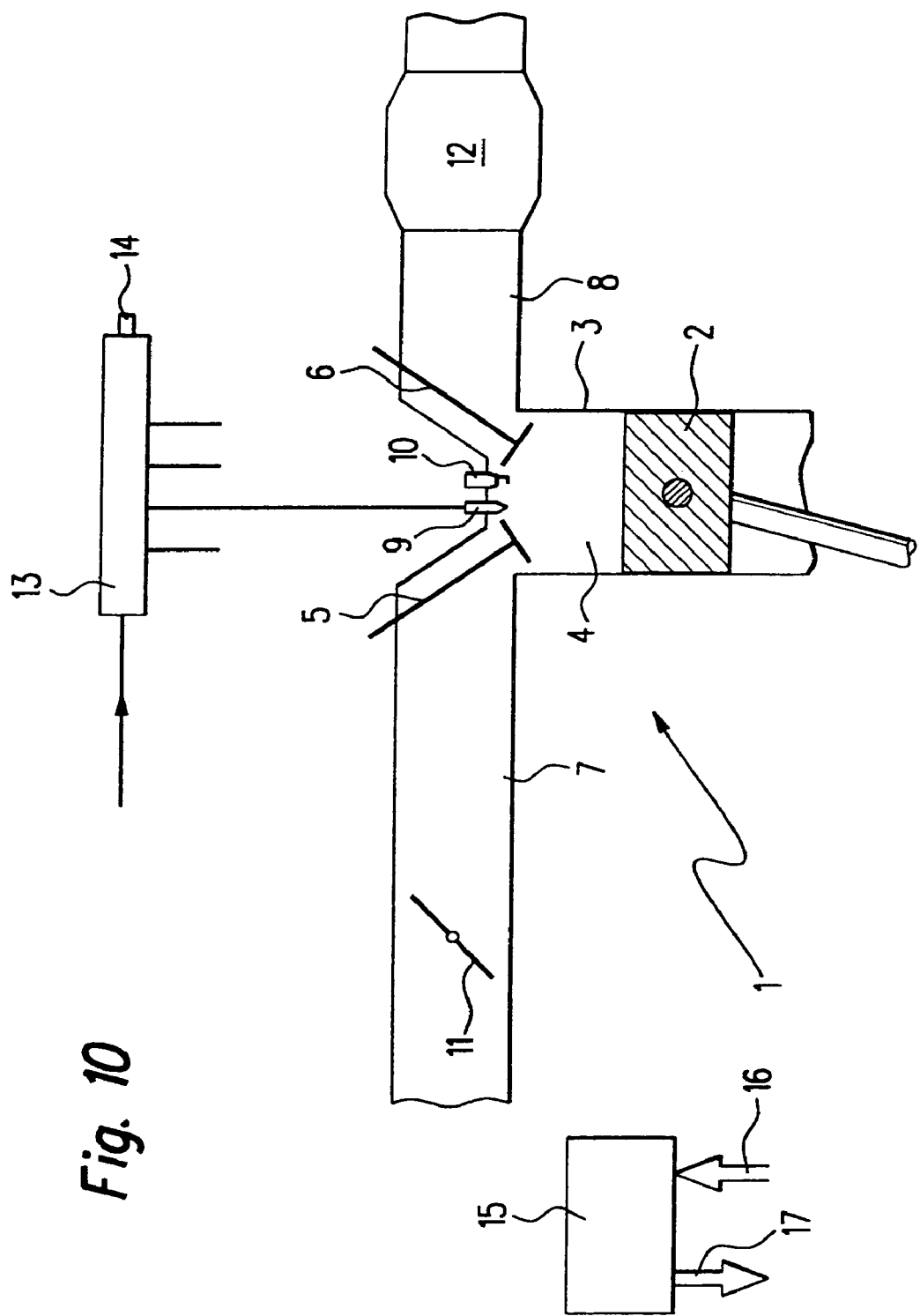
FIG. 10 a schematic illustration of an internal combustion engine according to the present invention.

FIG. 10 shows an internal combustion engine 1 of a motor vehicle in which a piston 2 is able to be moved back and forth in a cylinder 3. Cylinder 3 is provided with a combustion chamber 4, which is delimited, among others, by piston 2, a triggerable intake valve 5 and a triggerable discharge valve 6. The triggering of intake valve 5 and discharge valve 6 is implemented via electromagnetic actuators, which are not shown in FIG. 10, thereby allowing a flexible adjustment of the intake and discharge instants. Coupled to intake valve 5 is an intake manifold 7, and coupled to discharge valve 6 is a discharge pipe 8.

In the region of intake valve 5 and of discharge valve 6, a fuel injector 9 and a spark plug 10 project into combustion chamber 4. Fuel is able to be injected into combustion chamber 4 via injector 9. The fuel in combustion chamber 4 may be ignited by spark plug 10.

A rotatable throttle valve 11 through which air may be supplied to intake manifold 7 is disposed in intake manifold 7. The supplied air quantity is a function of the angle setting of throttle valve 11. A catalytic converter 12, which is used to clean the exhaust gases produced by the combustion of the fuel, is disposed in exhaust pipe 8.

Fuel injector 9 is connected to a fuel accumulator 13 by means of a pressure line. The fuel injectors of the other cylinders of internal combustion engine 1 are connected to fuel accumulator 13 in a corresponding manner. Fuel accumulator 13 is supplied with fuel via a supply line. A fuel pump, which is suitable to generate the desired pressure in fuel accumulator 13, is provided for this purpose.

Furthermore, a pressure sensor 14 by which the pressure in fuel accumulator 13 is able to be measured is also arranged on fuel accumulator 13. This pressure is the pressure exerted on the fuel and which is therefore used to inject the fuel into combustion chamber 3 of internal combustion engine 1 by means of fuel injector 9.

During operation of internal combustion engine 1, fuel is supplied into fuel accumulator 13. This fuel is injected into associated combustion chambers 4 via fuel injectors 9 of the individual cylinders 3. The injected fuel quantity is essentially a function of the injection time and the fuel pressure in fuel accumulator 13.

With the aid of spark plugs 10, combustions are generated in combustion chambers 3 by which pistons 2 are set into a back-and-forth motion. These movements are transmitted to a crankshaft (not shown), where they exert a torque.

A control unit 15 receives input signals 16, which represent performance quantities of internal combustion engine 1 measured by sensors. For instance, control device 15 is connected to pressure sensor 14, an air-mass sensor, an engine-speed sensor and the like. Moreover, control unit 15 is connected to a driving-pedal sensor, which generates a signal indicating the setting of a driver-operatable driving pedal and thereby indicates the torque that is called for. Control device 15 generates output signals 17 by which the performance of internal combustion engine 1 may be influenced via actuators. For example, control device 15 is connected to fuel injector 9, spark plug 10 and the like and generates the signals required for their triggering.

Among others, control device 15 is provided to control and/or regulate the performance quantities of internal combustion engine 1. For example, the fuel mass injected into combustion chamber 4 by fuel injector 9 is controlled and/or regulated by control device 15, in particular with respect to fuel economy and/or low pollutant generation. To this end, control unit 15 is equipped with a microprocessor, which has a program stored in a storage medium, in particular a flash memory, that is suitable to execute this control and/or regulation.

Control device 15 also triggers intake valve 5 and discharge valve 6, or their electromagnetic actuators, in order to draw fresh air into combustion chamber 4 during an intake cycle of cylinder 3, or to discharge waste gas from combustion chamber 4 into discharge pipe 8 during a discharge cycle. The present invention provides for a special triggering of intake valve 5 and discharge valve 6 for the direct starting of internal combustion engine 1 (FIG. 10), that is to say, without actuation by an electric starter or similar device.

Figure 9:
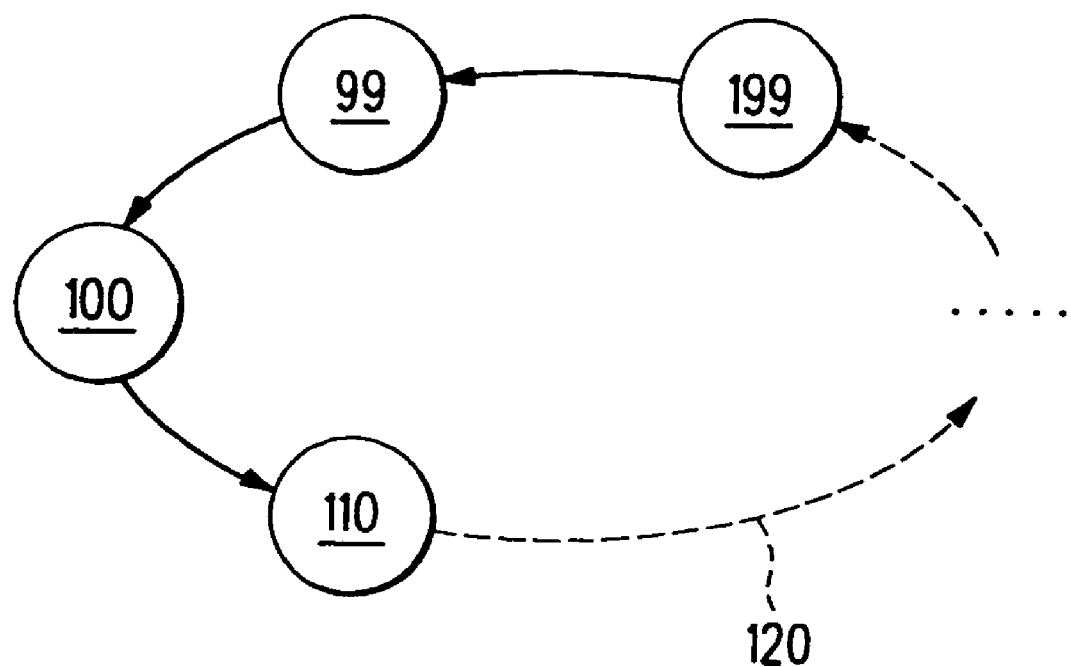
FIG. 9 a state diagram of a specific embodiment of the method according to the present invention.

To this end, as can be gathered from the state diagram in FIG. 9, internal combustion engine 1 is first brought into a start-up operating mode 100 for a start from standstill 99, from which it transitions to idle operating mode 110 after a certain period of time. Arrow 120, drawn in as a dashed line in FIG. 9, together with the four dots in the right half of the state diagram, indicates that internal combustion engine 1 (FIG. 10) may assume even more operating modes once idle operating mode 110 has been attained, prior to being deactivated in step 199, if appropriate.

For the purpose of illustration, the time characteristic of a triggering of intake valve 5 and discharge valve 6 may be plotted over the crank angle, denoted by KW. Such an illustration is also known as valve-trigger diagram or as valve-lift curve.

Figure 1:
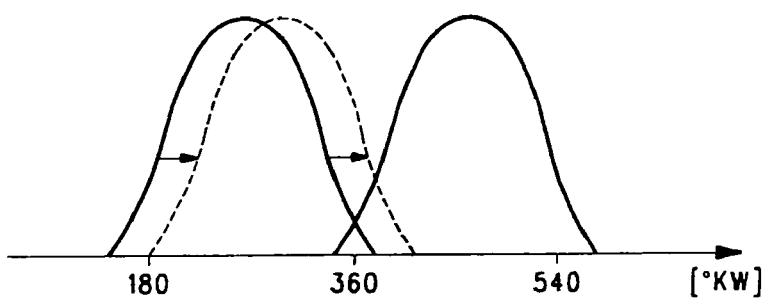
FIGS. 1 through 8 in each case a valve-trigger diagram according to a specific embodiment of the present invention.

FIG. 1 shows such a valve-trigger diagram for a first specific embodiment of the present invention; here, the left part of the solid curve, which extends between approximately 170° KW and 370° KW, is assigned to discharge valve 6, whereas the right part of the solid curve, which extends between approximately 350° KW and 560° KW, is assigned to intake valve 5. In the additional valve-trigger diagrams of FIGS. 2 through 8, the left side of the solid curve of the particular valve-trigger diagram is also always assigned to discharge valve 6 and the right part of the curve to intake valve 5. This corresponds to a portion of a regular working cycle of internal combustion engine 1 (FIG. 10) in which, following a combustion (not shown) of an air-fuel mixture in combustion chamber 4 of cylinder 3 (FIG. 10), the exhaust gas is discharged via discharge valve 6 and fresh gas is then drawn in through intake valve 5.

The solid curve in FIG. 1 represents a conventional triggering of discharge valve 6 and intake valve 5, as it occurs in idle operating mode 110 (FIG. 9), for instance.

In contrast to a conventional triggering, the present invention provides for the discharge instant to be retarded in the first specific embodiment according to FIG. 1. This is symbolized by the dashed curve in FIG. 1, which represents a triggering of discharge 6 according to the present invention and is shifted, i.e., retarded, by approximately 20° to 30° KW compared to the conventional triggering. In addition, the retardation according to the present invention is illustrated clearly by the two arrows shown in FIG. 1.

The afore-mentioned values of the crankshaft angle for the retardation according to the present invention are exemplary values, which may vary considerably depending on the internal combustion engine, the ambient conditions and the like. This also applies to all other crankshaft-angle values mentioned or illustrated, without restricting the universality.

The retardation according to the present invention results in a better conversion into mechanical action of the combustion energy that is released during the first combustion in a direct start of internal combustion engine, which may be utilized for starting internal combustion engine 1.

According to another specific embodiment of the present invention, a similar effect may also be achieved by shortening the discharge phase. In this case, discharge valve 6 (FIG. 10) is opened for a shorter period of time compared to idle operating mode 110 (FIG. 9), for instance. The triggering required for the shortened discharge phase may be gathered from the dashed curve in FIG. 2 where the curves associated with a conventional triggering are once again drawn in as a solid line. In contrast to the previous specific embodiment of the present invention, the end of the discharge phase, shortened according to the present invention, coincides in time with the end of the conventional discharge phase. This method variant may also be used for internal combustion engines that allow a variation of only the opening durations of intake/discharge valves 5, 6.

Figure 3:
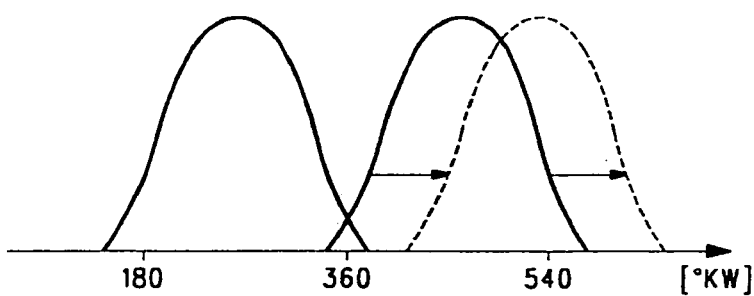

FIG. 3 shows another method variant in which a closing instant of intake valve 5 is retarded with respect to the standard closing instant used in idle operating mode 110, for instance. The retardation of the closing instant according to the present invention results from a shifting of the triggering of the intake valve 5, symbolized in FIG. 3 by arrows pointing to the right, such shifting once again being drawn in as a dashed line.

The shifting of the closing instant of intake valve 5 provided by the present invention lowers the compression pressure prevailing in combustion chamber 4 of internal combustion engine 1, thereby also facilitating a reliable direct start of internal combustion engine 1.

Figure 4:
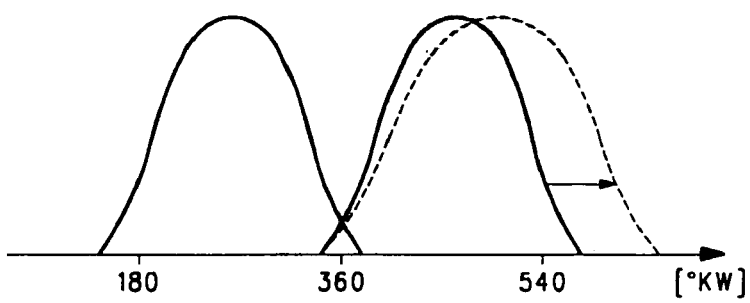

An additional method variant according to the present invention, in which a retardation of the closing instant of intake valve 5 results, is shown in FIG. 4 and characterized by an extended opening duration of intake valve 5 compared to idle operating mode 110, for example. This method variant is also able to be used for internal combustion engines that allow a variation of only the opening duration of intake/discharge valves 5, 6, but no adjustment of a triggering phase of intake/discharge valves 5, 6.

Figure 5:
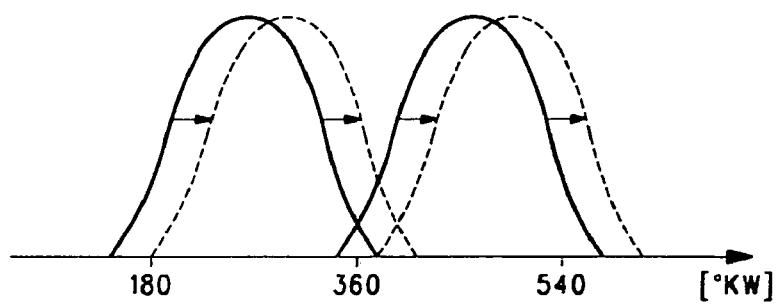

An additional advantageous method variant is shown in FIG. 5 in which both the triggering of discharge valve 6 and the triggering of intake valve 5 are time-retarded with respect to idle operating mode 110, for example.

Figure 6:
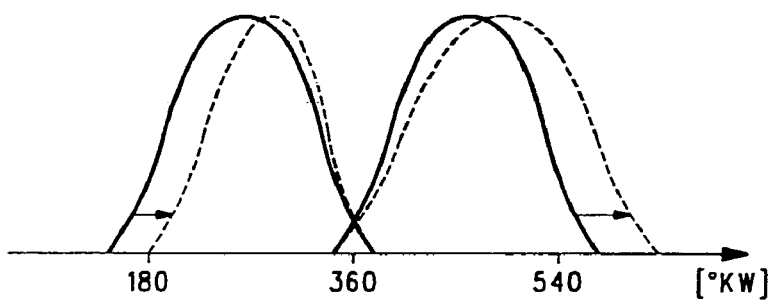
Figure 7:
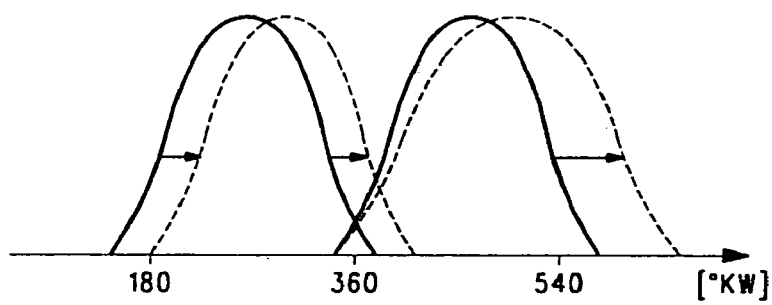
Figure 8:
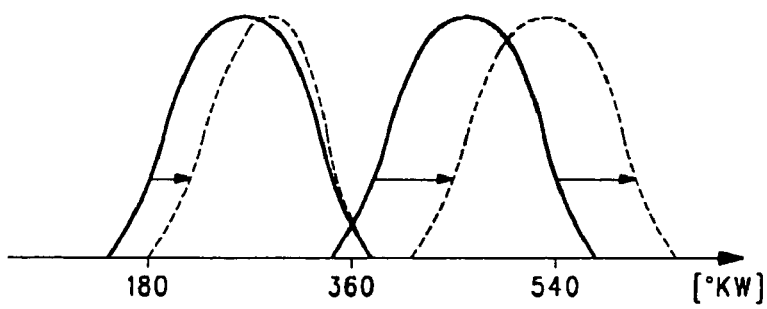

The same effects are also achieved in the variants of the present invention according to FIGS. 6 through 8, which each represent a different combination of the afore-discussed method variants.

Figure 2:
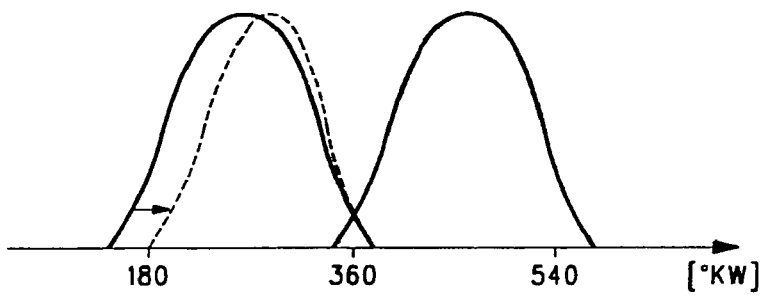

In this context, the valve-trigger diagram from FIG. 6 shows a combination of the method variants of FIGS. 2 and 4, i.e., in the triggering according to the valve-trigger diagram of FIG. 6, discharge valve 6 (FIG. 10) is opened for a shorter period of time compared to idle operating mode 110 (FIG. 9), for example, and the opening duration of intake valve 5 is simultaneously prolonged compared to idle operating mode 110, for instance.

The variant shown in FIG. 7 is distinguished in that the triggering of discharge valve 6 is shifted, i.e., retarded, by approximately 20° to 30° KW compared to the conventional triggering and in that the opening duration of intake valve 5 is extended simultaneously compared to idle operating mode 110.

The valve-trigger diagram in FIG. 8 shows yet another specific embodiment of the present invention in which the discharge phase is shortened and in which the closing instant of the intake valve is simultaneously retarded compared to idle operating mode 110 in that the triggering of intake valve 5 is shifted relative to the conventional triggering.

The three last-named variants of the valve triggering according to FIGS. 6 through 8 also contribute to a reliable direct start-up of internal combustion engine 1.

In general, the retardation of the starting discharge instant and/or the closing instant according to the present invention, used during start-up operating mode 100, is realizable in all internal combustion engines having camshaft-free valve gears.

Moreover, the retardation according to the present invention is also achievable in camshaft-based valve-gear systems, for example by the use of phase actuators which in each case are able to adjust an intake-camshaft or a discharge camshaft.

Another specific embodiment of the present invention requires only one phase actuator, which simultaneously adjusts the intake camshaft and the discharge camshaft. A valve-lift curve resulting in the process is shown in FIG. 5 by way of example.

In another specific embodiment of the present invention, which is based on an adjustment of the camshaft(s), the intake camshaft and/or the discharge camshaft are/is already adjusted during a deactivation 199 (compare FIG. 9) of internal combustion engine 1 for the subsequent start of internal combustion engine 1 in start-up operating mode 100, so that the adjustment of the camshaft(s) required to retard the starting discharge instant and/or the closing instant of intake valve 5 according to the present invention, used during start-up operating mode 100, will not have to be implemented as late as at the next start of internal combustion engine 1.

Depending on the means utilized to achieve the retardation according to the present invention, it is possible to adjust a retardation that has a reducing effect with increasing rotational speed of internal combustion engine 1, or an abrupt deactivation of the retardation once a predefinable minimum rotational speed of internal combustion engine 1 has been exceeded.

A combination of equivalent or different phase actuators, for example a series connection of a vane-type phase actuator known from the related art having a likewise known chain adjuster is also conceivable to realize the adjustment range required for the individual system.

Furthermore, in an additional specific embodiment of the present invention, the combination of one or a plurality of the afore-mentioned methods with a variation of the valve lift of intake valve 5 and/or discharge valve 6 is provided, which results in a further improvement of the direct start-up characteristics of internal combustion engine 1.

Although the method according to the present invention is especially suited for the use in internal combustion engines having direct injection, it is also conceivable to utilize the valve triggering according to the present invention in internal combustion engines having different injection system

What is claimed is:

1. A method for operating an internal combustion engine having at least one triggerable intake valve and at least one triggerable discharge valve, comprising:

directly starting the internal combustion engine in a start-up operating mode in which the discharge valve discharges an exhaust gas of the internal combustion engine; and
following the directly starting, operating the internal combustion engine in at least one additional operating mode;
performing a retardation involving at least one of:
  time-retarding a starting discharge instant of the discharge valve with respect to a standard discharge instant used during the at least one additional operating mode, and
  time-retarding an opening instant and a closing instant of the intake valve with respect to a standard closing instant used during the at least one additional operating mode, the intake valve being used during the start-up operating mode for an aspiration of a fresh gas.

2. The method as recited in claim 1, wherein the retardation is implemented by adjusting at least one of a discharge camshaft that triggers the discharge valve and an intake camshaft that triggers the intake valve.

3. The method as recited in claim 2, further comprising:
using a phase actuator in each case to adjust one of the intake camshaft and the discharge camshaft.

4. The method as recited in claim 2, further comprising:
using a phase actuator for the simultaneous adjustment of the intake camshaft and the discharge camshaft.

5. The method as recited in claim 2, further comprising:
using a valve-gear system influencing an opening time of one of the intake valve and the discharge valve to adjust one of the intake camshaft and the discharge camshaft.

6. The method as recited in claim 2, wherein at least one of the intake camshaft and the discharge camshaft is already adjusted during a deactivation of the internal combustion engine for a subsequent start in the start-up operating mode.

7. The method as recited in claim 1, wherein at least one of the intake valve and the discharge valve is triggered by a camshaft-free valve-gear system.

8. The method as recited in claim 1, wherein a valve lift of one of the intake valve and the discharge valve is varied.

9. The method as recited in claim 1, further comprising:
decreasing the retardation in a stepwise manner with increasing rotational speed of the internal combustion engine.

10. The method as recited in claim 1, further comprising:
deactivating the retardation once a predefinable minimum rotational speed of the internal combustion engine is exceeded.

11. An internal combustion engine, comprising:
at least one triggerable intake valve;
at least one triggerable discharge valve that is directly started in a start-up operating mode and, following the start, is operated in at least one additional operating mode; and
an arrangement for performing a retardation including at least one of:
  an arrangement for time-retarding a starting discharge instant of the discharge valve with respect to a standard discharge instant used during the at least one additional operating mode, and
  an arrangement for time-retarding an opening instant and a closing instant of the intake valve with respect to a standard closing instant used during the at least one additional operating mode, the intake valve being used during the start-up operating mode for an aspiration of a fresh gas.

12. A control device for an internal combustion engine having at least one triggerable intake valve and at least one triggerable discharge valve that is directly started in a start-up operating mode and, following the start, is operated in at least one additional operating mode, comprising:
an arrangement for performing a retardation including at least one of:
  an arrangement for time-retarding a starting discharge instant of the discharge valve with respect to a standard discharge instant used during the at least one additional operating mode, and
  an arrangement for time-retarding an opening instant and a closing instant of the intake valve with respect to a standard closing instant used during the at least one additional operating mode, the intake valve being used during the start-up operating mode for an aspiration of a fresh gas.

13. A computer program for a control device for an internal combustion engine having at least one triggerable intake valve and at least one triggerable discharge valve that is directly started in a start-up operating mode and, following the start, is operated in at least one additional operating mode, comprising:
instructions for performing a retardation including at least one of:
  instructions for time-retarding a starting discharge instant of the discharge valve with respect to a standard discharge instant used during the at least one additional operating mode, and
  instructions for time-retarding an opening instant and a closing instant of the intake valve with respect to a standard closing instant used during the at least one additional operating mode, the intake valve being used during the start-up operating mode for an aspiration of a fresh gas.

14. The computer program as recited in claim 13, wherein the computer program is stored on an electric memory medium.

15. The computer program as recited in claim 14, wherein:
the electric memory medium includes one of a flash memory and a read-only memory.

* * * * *